United States Patent [19]

Iwanczyk

[11] Patent Number: 5,371,376
[45] Date of Patent: Dec. 6, 1994

[54] MERCURIC IODIDE DETECTOR

[75] Inventor: Jan S. Iwanczyk, Los Angeles, Calif.

[73] Assignee: Xsirius, Inc., Camarillo, Calif.

[21] Appl. No.: 94,772

[22] Filed: Jul. 20, 1993

[51] Int. Cl.⁵ .............................................. G01T 1/24
[52] U.S. Cl. ............................. 250/370.12; 250/352; 250/370.15
[58] Field of Search ..................... 250/370.12, 370.13, 250/370.15, 352, 370.01

[56] References Cited

U.S. PATENT DOCUMENTS

| | | | |
|---|---|---|---|
| 3,949,210 | 4/1976 | Eichinger et al. | 250/336.1 X |
| 4,255,659 | 3/1981 | Kaufman et al. | 250/370.13 X |
| 4,883,967 | 11/1989 | Tsutsui et al. | 250/370.12 X |
| 5,225,677 | 7/1993 | Yeh et al. | 250/370.15 |
| 5,235,817 | 8/1993 | Gallagher et al. | 250/352 X |
| 5,248,885 | 9/1993 | Sato et al. | 250/370.12 |

FOREIGN PATENT DOCUMENTS

| | | | |
|---|---|---|---|
| 473125 | 3/1992 | European Pat. Off. | 250/352 |
| 59-46573 | 3/1984 | Japan | 250/370.01 |
| 62-245177 | 10/1987 | Japan | 250/370.15 |

OTHER PUBLICATIONS

Eichinger et al, 'Small Portable Detector Head Using Mis-Contacted CdTe for X-Ray Spectroscopy', Rev. Phys. Appl., 12(2), 1977, pp. 339-341.

Madden et al., 'High Resolution Si(Li) Spectrometer with Thermoelectric Cooler', Nuc. Inst. & Meta., 159, 1979, pp. 337-338.

Iwanczyk et al., 'Advances in Mercuric Iodine Energy Dispersive X-Ray Array Detectors and Associated Miniaturized Processing Electronics (Invited)', Rev. Sci. Inst., 60(7), 1989, pp. 1561-1567.

Primary Examiner—Constantine Hannaher
Assistant Examiner—Edward J. Glick
Attorney, Agent, or Firm—Herbert M. Shapiro

[57] ABSTRACT

Mercuric iodide detector systems are made less power consumptive and smaller by employing a single Peltier cooler rather than the two required by prior art systems. The optimal temperature requirements (and thus leakage current conditions) for the two critical temperature sensitive components for such a system are met by cooling the components to a reference temperature using a single cooler and by illuminating the detector to achieve the required operating performance. The elimination of the extra cooler not only conserves power and reduces maintenance requirements, but also reduces size. The use of light to achieve the required detector and FET leakage current relation for optimum operation is permitted by the implementation of a feedback loop for automatic control of the operation.

11 Claims, 3 Drawing Sheets

MERCURIC IODIDE DETECTOR

FIELD OF THE INVENTION

This invention relates to a Mercuric Iodide detector and more particularly to a low power, small size detector with associated electronics and detector packaging.

BACKGROUND OF THE INVENTION

Mercuric iodide detector spectrometers are known in the art. Such systems beside the detector include an amplification circuit with a field effect transistor (FET) and a circuit for a pulsed optical or other pulsed charge restoration reset. Such prior art systems also include two Peltier coolers, one for the transistor and one for the detector. Although Mercuric Iodide spectrometers can operate at room temperature, it is possible to obtain a lower electronic noise and a higher energy resolution when the detector and the FET are cooled. In addition, the cooling of both components to the predetermined temperature allows the construction of systems with parameters stable over the wide range of ambient temperatures. The necessity for two coolers arises from the fact that the transistor and the detector have to be maintained at different temperatures, the FET requiring a significantly lower temperature to avoid the unwanted leakage current which occur through the gate of the transistor.

Pulsed optical or other pulsed charge restoration feedback amplification systems require higher detector leakage currents than the FET leakage currents. This requirement forces operation of the detector at temperatures much higher than optimum.

The use of two coolers results in relatively high power requirements and relatively large size for the system.

BRIEF DESCRIPTION OF THE INVENTION

The invention is based on the recognition that in Mercuric Iodide detectors, Peltier coolers alone were unable to cool the transistor and the detector efficiently for optimal operation in pulsed optical or other pulsed charge restoration feedback mode and that the leakage current of the detector and FET were the important parameters to be controlled and that it could be controlled by light in addition to control by cooling. Moreover, the light intensity incident on the detector could be controlled by a feedback circuit operative as a function of the difference between the detector leakage current and the FET leakage current, thus providing for automatic control and adjustment of the system.

Consequently, only one Peltier cooler is required and power consumption is relatively low. The detector can operate at lower temperature and provide better performance for the spectrometer.

DETAILED DESCRIPTION OF ILLUSTRATIVE EMBODIMENT OF THIS INVENTION

Figure 1:
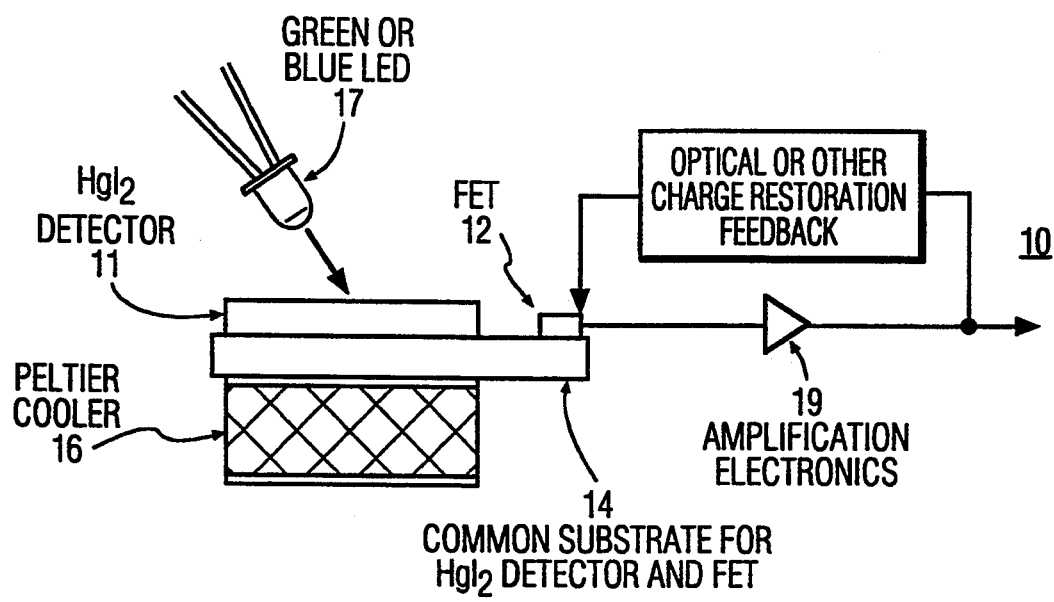
FIG. 1 is a schematic diagram of a mercuric iodide detector system in accordance with the principles of this invention.

FIG. 1 shows a Mercuric iodide detector system 10 in accordance with the principles of this invention. The system includes a Mercuric iodide detector 11 and a field effect transistor 12 on a common, electrically-insulating, heat conducting substrate 14, conveniently of Beryllium oxide. Peltier cooler 16 is secured to the underside of substrate 14 for cooling components 11 and 12 to a prescribed temperature. A light source, 17 comprising a blue or green light emitting diode conveniently is positioned to illuminate detector 11.

Figure 2:
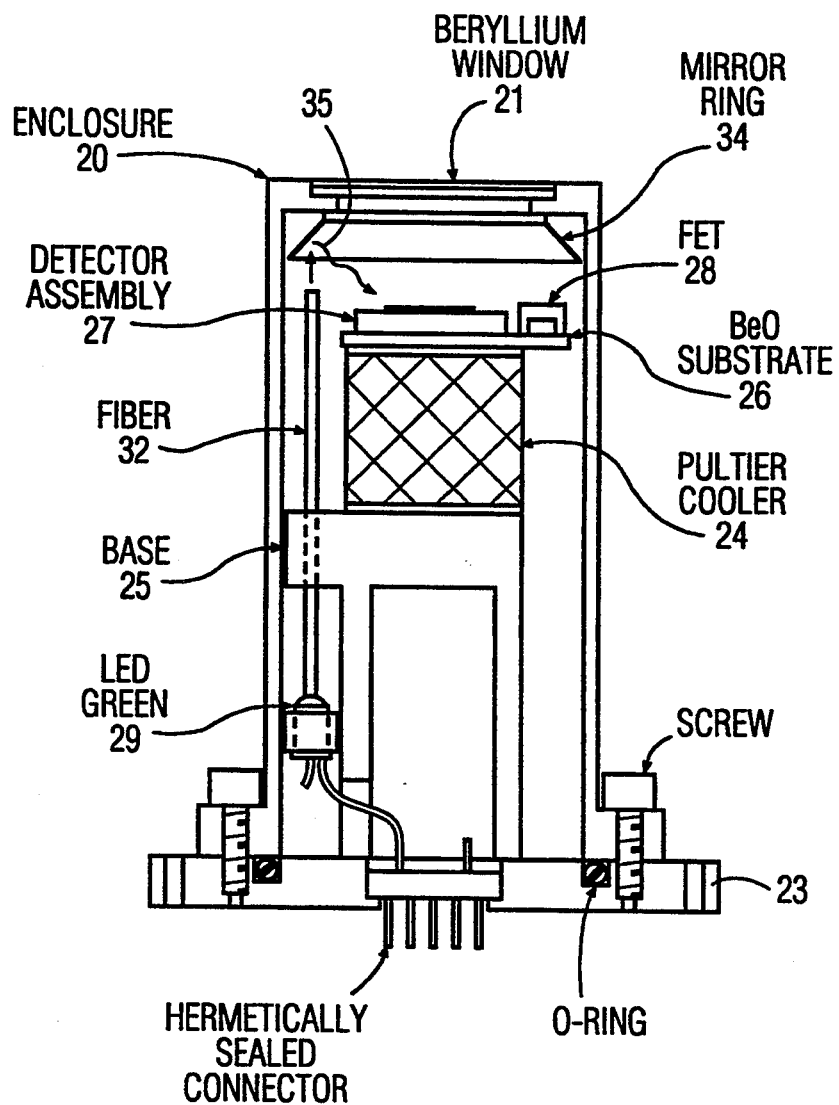
FIG. 2 is a schematic diagram of a practical embodiment of the detector system of FIG. 1.

FIG. 2 shows a practical embodiment for the detector subsystem of the system of FIG. 1. The subsystem includes an enclosure 20 which includes a Beryllium window 21 at it's top surface as viewed. The enclosure also includes a base support 23. The Peltier cooler 24 is mounted on the copper heatsink 25. A Beryllium oxide substrate 26 is mounted on the peltier cooler 24.

The Mercuric iodide assembly 27 is positioned at the top surface of substrate 26.

A field effect transistor 28 is secured to the surface of substrate 26 and shielded from the green or blue light by a cover.

Base 23 also supports light emitting diode 29. Diode 29 is optically coupled to optical fiber 32. Fiber 32 directs light towards a mirror ring 34. Mirror ring 34 redirects the light onto detector assembly 27 as indicated by wavy arrow 35.

Figure 3:
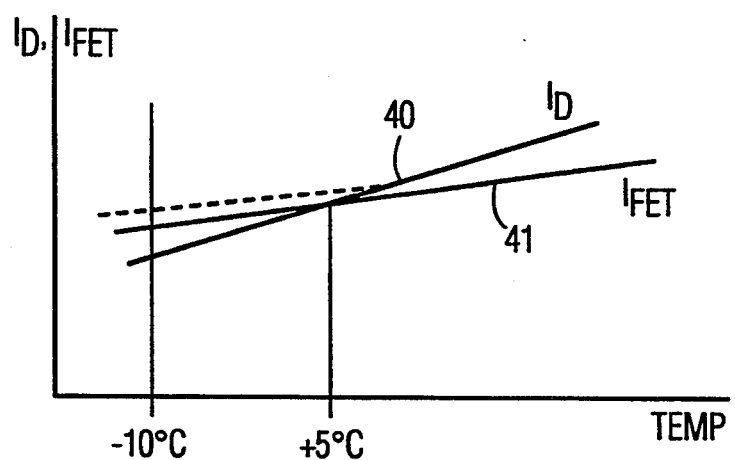
FIG. 3 is a graph of the operating characteristics of the system of FIG. 2.

FIG. 3 shows curves 40 and 41 representing the leakage currents for Mercuric Iodide detector 11 and for the field effect transistor 12, respectively. The curves are plotted as a function of temperature and intersecting in this case at about plus 5 degrees centigrade. The pulsed charge restoration feedback amplification system requires the detector leakage current to be higher than the transistor leakage current. The broken line represents the detector leakage during light illumination. The light illumination prevents the decrease of the detector leakage current below the FET leakage current in the whole temperature operating range.

Figure 4:
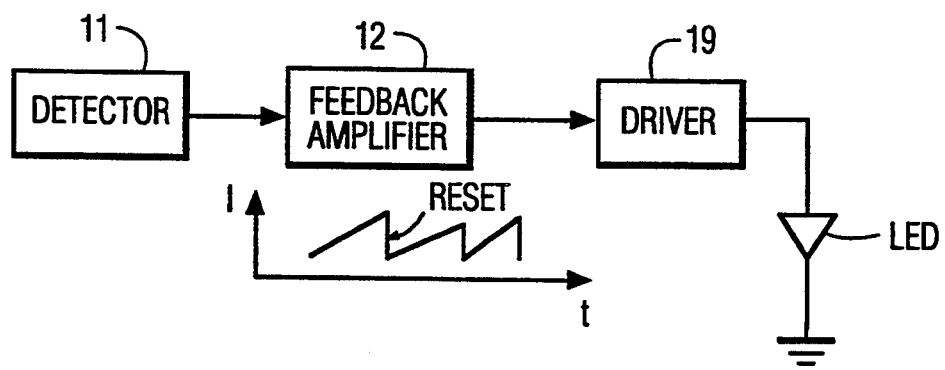
FIG. 4 is a circuit diagram of a feedback circuit for controlling the light incident on the detector of FIG. 1.

FIG. 4 shows a feedback circuit for driving the light emitting diode illuminating detector 11. The circuit includes the Mercuric Iodide detector 11, pulsed charge restoration feedback amplifier 12 and LED driver 19. LED driver 19 contains a circuit for sensing a difference between detector and input FET leakage currents and converts this signal into an appropriate bias voltage for the LED. In the case of pulsed optical or pulsed transistor restoration schemes, the frequency of reset is a measure of the difference between detector and FET leakage currents.

Although the invention has been described in terms of Mercuric Iodide, other ionization radiation detector materials also may be used. Examples of such materials are Cadmium Zinc Telluride, Lead Iodide, Besmuth Triiodide, Thallium Bromide and Cadmium Telluride.

What is claimed is:

1. A Mercuric Iodide detector system including a Mercuric Iodide detector and a field effect transistor, said system including a cooler to maintain both said detector and said transistor at a reference temperature, said system also including a light source, said light source being operative to direct light at said detector for maintaining a leakage current thereof above a leakage current of the field effect transistor at said reference temperature.

2. A system as set forth in claim 1 wherein said light source comprises a light emitting diode and said transistor comprises a field effect transistor.

3. A system as set forth in claim 2 wherein said detector and said transistor are mounted on a substrate in an enclosure and said cooler also is mounted on said substrate for achieving said reference temperature, said enclosure including a mirror to redirect light from said light source to said detector.

4. A system as set forth in claim 1 also including an optical fiber for directing light from said light source to said detector.

5. A system as set forth in claim 3 also including a optical fiber for directing light from said light emitting diode to said mirror.

6. A system as set forth in claim 2 wherein said light emitting diode generates green light.

7. A system as set forth in claim 2 wherein said light emitting diode generates blue light.

8. A system as set forth in claim 1 wherein said cooler comprises a Peltier cooler.

9. A system as set forth in claim 1 also including a feedback circuit for controlling the intensity of said light source as a function of the difference between the leakage current in said detector and in said transistor.

10. A system as set forth in claim 3 also including a feedback circuit for controlling the intensity of said light emitting diode as a function of the difference between the leakage current in said detector and in said field effect transistor.

11. A detector system including an ionization radiation detector and a field effect transistor, said system including a cooler to maintain both said detector and said transistor at a reference temperature, said system also including a light source, said light source being operative to direct light at said detector for maintaining a leakage current thereof above a leakage current of the field effect transistor at said reference temperature.

* * * * *